United States Patent [19]  [11] 4,131,640
von Kutepow et al.  [45] Dec. 26, 1978

[54] SEPARATING RHODIUM FROM SOLUTION CONTAINING RHODIUM CARBONYL COMPLEXES AND CONVERTING THE SEPARATED RHODIUM INTO SOLUBLE RHODIUM CARBONYL COMPLEXES

[75] Inventors: Nikolaus von Kutepow, Karlsruhe; Franz J. Mueller, Limburgerhof; Peter Reuter, Bad Durkheim, all of Fed. Rep. of Germany

[73] Assignee: BASF Aktiengesellschaft, Ludwigshafen, Fed. Rep. of Germany

[21] Appl. No.: 320,847

[22] Filed: Jan. 4, 1973

[30] Foreign Application Priority Data

Jan. 7, 1972 [AT] Austria ................................. 127/72

[51] Int. Cl.$^2$ ............................................. C01G 55/00
[52] U.S. Cl. .................................. 423/22; 252/411 R; 252/413; 252/414; 423/417
[58] Field of Search ..................... 423/22, 418, 417; 252/411R, 413, 414

[56] References Cited

U.S. PATENT DOCUMENTS

| 2,748,167 | 5/1956 | Hagemeyer et al. | 423/418 |
| 3,716,626 | 2/1973 | Kniese et al. | 423/418 |
| 3,887,489 | 6/1975 | Fannin et al. | 423/22 |

*Primary Examiner*—Herbert T. Carter
*Attorney, Agent, or Firm*—Keil, Thompson & Shurtleff

[57] ABSTRACT

A process for the separation of rhodium from a solution containing a rhodium carbonyl complex such as is obtained in the carbonylation of an alkanol or of an olefinically or acetylenically unsaturated compound with carbon monoxide and water and conversion of the separated rhodium into a soluble rhodium carbonyl complex, in which the solution containing the rhodium carbonyl complex is treated with hydrogen in the presence of a carrier substance at a temperature of from 25° to 300° C and at a pressure of from 1 to 700 atmospheres, the solution freed from rhodium is separated and the rhodium precipitated on the carrier is converted into a soluble rhodium carbonyl complex by treatment with carbon monoxide in the presence of a solvent and a compound which can replace the carbon monoxide as a ligand at a temperature of from 20° to 300° C and at a pressure of from 1 to 700 atmospheres.

7 Claims, No Drawings

SEPARATING RHODIUM FROM SOLUTION CONTAINING RHODIUM CARBONYL COMPLEXES AND CONVERTING THE SEPARATED RHODIUM INTO SOLUBLE RHODIUM CARBONYL COMPLEXES

The present invention relates to a process for the separation of rhodium from a solution containing a rhodium carbonyl complex such as is obtained in the carbonylation of olefinically or acetylenically unsaturated compounds with carbon monoxide and water and the conversion of the separated rhodium into a soluble rhodium carbonyl complex.

In the recovery of rhodium from homogenous rhodium-containing discharges from rhodium-catalyzed carbonylation reactions the discharge has hitherto been treated with a metal baser than rhodium and rhodium deposited as metal (cf. Japanese Patent Publication No. 23763/1966). The method has the disadvantage that the end product of the synthesis is contaminated by the resultant salt of the baser metal and the latter has to be removed. According to another prior art method, for example in the oxo reaction which is catalyzed by rhodium, the rhodium is separated from the reaction mixture by treatment with water or steam at elevated temperature in metallic form (cf. French Pat. No. 1,588,014). Apart from the fact that in carbonylation reactions carried out in the presence of water this method is unsuitable because the rhodium catalysts used have to be stabilized against the action of water, the rhodium is precipitated as a fine deposit which can only be separated from the reaction mixture by expensive methods. Moreover, both of these methods have the disadvantage that in order for the rhodium to be reused for catalysis it has first to be converted into the appropriate salt from which the catalytically active carbonyl complex can be formed.

It is an object of the invention to provide a process in which rhodium is obtained in readily separable form and in the recovered form can be converted in a simple way into rhodium carbonyl complexes. It is another object of the invention to provide a process in which rhodium carbonyl complexes are recovered in such a form that they can be used again for the carbonylation reaction in question.

In accordance with this invention these and other objects are achieved in an excellent manner in a process for the separation of rhodium from a solution containing a rhodium carbonyl complex (such as is obtained in the carbonylation of an alkanol or an olefinically or acetylenically unsaturated compound with carbon monoxide and water) and for the conversion of the separated rhodium into a soluble carbonyl complex which comprises contacting the solution containing the rhodium complex with hydrogen in the presence of a carrier at a temperature of from 25° to 300° C. and under pressure of from 1 to 700 atmospheres, separating the solution devoid of rhodium and contacting the rhodium deposited on the carrier with carbon monoxide in the presence of a solvent and a compound capable of replacing carbon monoxide as ligand at a temperature of from 20° to 300° C. and at a pressure of from 1 to 700 atmospheres.

The starting material is a solution containing a rhodium carbonyl complex such as is obtained in the carbonylation of an olefinically or acetylenically unsaturated compound with carbon monoxide and water or in the carbonylation of an alkanol. These solutions generally contain from 0.001 to 1.0% by weight of rhodium (calculated as metal) in the form of a carbonyl complex. This carbonyl complex is preferably stabilized with a compound which is capable of replacing the carbon monoxide as ligand; appropriate compounds are set out later. Carbonylation reactions in which the said solutions are obtained include for example the synthesis of acetic acid from methanol and carbon monoxide or the synthesis of propionic acid from ethylene, carbon monoxide and water.

Particular importance attaches to the rhodium-catalyzed carbonylation of acetylene with carbon monoxide and water to form hydroquinone at temperatures of 100° to 250° C. and at pressures of 25 to 700 atmospheres gauge and the carbonylation of butadiene with carbon monoxide and water to form adipic acid at temperatures of from 50° to 300° C. and at pressures of from 5 to 300 atmospheres gauge. Typical starting solutions such as are used for the present process contain for example 5 to 95% by weight of methanol, 5 to 95% by weight of water, 5 to 15% by weight of hydroquinone or 5 to 25% by weight of adipic acid and 0.001 to 1.0% by weight of rhodium carbonyl complex, calculated as metal.

Treatment with hydrogen is carried out at temperatures of from 25° to 300° C. Temperatures of from 100° to 200° C. have proved to be particularly suitable. At the same time a pressure of from 1 to 700 atmospheres gauge is maintained, pressures of from 100 to 200 atmospheres being preferred.

The treatment is carried out in the presence of carriers such as are conventionally used for hydrogenation catalysts, particularly those having a large surface area per unit weight, for example activated carbon, silica gel, aluminum oxide, infusorial earth or magnesium oxide. It has proved to be particularly suitable for the carrier to contain Group 8 noble metals, for example from 0.001 to 10% by weight of palladium, platinum, rhodium, iridium, ruthenium or osmium. Activated carbon which has been doped with palladium has proved to be especially advantageous. The rhodium is firmly deposited on the carrier used during the treatment.

The treatment may be carried out batchwise or continuously in suitable apparatus. Since the carrier is used in the form of coarse pieces, in spherical form or as granules, it can easily be separated from the reaction solution devoid of rhodium by decantation. In the preferred continuous method the reaction solution containing rhodium is simply passed under the specified conditions over the carrier which may if desired have been doped with the said metals. Separation is generally carried on until the carrier contains from 0.1 to 10% by weight of rhodium.

The rhodium thus precipitated on the carrier is then converted into a soluble rhodium carbonyl complex by treatment with carbon monoxide in the presence of a solvent and a compound capable of replacing carbon monoxide as a ligand at a temperature of from 20° to 300° C. and at a pressure of from 1 to 700 atmospheres. Temperatures of from 100° to 200° C. and pressures of from 100 to 700 atmospheres have proved to be particularly suitable. Examples of suitable solvents are aliphatic, cycloaliphatic and aromatic hydrocarbons such as benzene, toluene, cyclohexane and octane; alkanols, for example methanol, ethanol, isopropanol and glycol; esters, for example methyl acetate and ethyl acetate; ethers, for example tetrahydrofuran, dioxane and diethylene glycol dimethyl ether; ketones, for example acetone and cyclohexanone; amines, for example pyridine and dimethylaminoethanol; and also organic nitro compounds such as nitro benzene.

Polar solvents, particularly lower alkanols of one to four carbon atoms, for example methanol, have proved to be especially suitable.

The compounds capable of replacing carbon monoxide as ligand in the complexes may be olefinically or acetylenically unsaturated hydrocarbons, for example acetylene, propyne, butyne, ethylene, styrene, isomeric butenes, butadiene-1,3, butadiene-1,4 and propadiene; organic compounds of trivalent nitrogen, phosphorus or arsenic, also alkyl halides, aryl halides, hydrogen halides, ammonia, ammonium, phosphonium and arsonium salts and free halogens. Examples of suitable compounds are dimethylamine, trimethylamine, butylpyrrolidone, azobenzene, aniline, dimethylaniline, acetonitrile, benzonitrile, tributylphosphone, triphenylphosphone, tributyl phosphite, triphenyl phosphite, methyl iodide, chloroform, benzyl iodide, hydrogen iodide, hydrogen bromide, tetraphenyl phosphonium bromide and iodide, tetraethyl phosphonium bromide and iodide, and iodine.

It is particularly preferred to use pyridine, methyl iodide, styrene, acetylene, ammonia, azobenzene or an alkylamine.

It is also possible for a solvent, for example pyridine or nitrobenzene, which forms an azo compound under the reaction conditions, to fulfil the function of a compound which can replace carbon monoxide as ligand in the complex, or conversely the compound used to function as ligand, such as an olefinically unsaturated hydrocarbon, for example butadiene, to act at the same time as a solvent.

It is particularly advantageous to carry out the process industrially by using the carrier which now contains less rhodium for further precipitation of rhodium and to repeat these operations alternately.

The Examples given below illustrate the present invention.

The following paragraph describes the production of a homogeneous discharge containing rhodium such as is formed in reactions of acetylene and carbon monoxide.

A solution (which has been prepared by mixing a solution of 10 ml of water in 190 ml of methanol and a solution of 61 mg of hydrated rhodium (III) chloride and 25 mg of potassium iodide in 50 ml of water) is exposed in a glass insert in a high pressure vessel having a capacity of 0.8 liter at a temperature of 130° C. for a period of thirty minutes to 400 atmospheres gauge pressure of a gas mixture of 11% by volume of acetylene and 89% by volume of carbon monoxide. After the contents of the high pressure vessel have been cooled and released from pressure, 233 g of a homogeneous solution containing rhodium is obtained which, in addition to methanol and water, contains 29.9 g of hydroquinone and 23.3 mg of homogeneously dissolved rhodium.

EXAMPLES 1 to 12

A definite amount of carrier material is added to a homogeneous rhodium-containing discharge prepared as described above and having a known content of rhodium. The discharge thus prepared is exposed in a 0.8 liter high pressure vessel with a glass insert to a superatmospheric pressure of hydrogen ($p_{H_2}$) and to an elevated temperature (T) for a period of time (t). $p_{H_2}$, T, t and carrier material are given in the following Table 1.

After cooling the contents of the high pressure vessel to room temperature and releasing to atmospheric pressure the liquid components of the discharge are separated from the solid components by filtration or centrifuging. The solid components are combined and washed with 50 ml of methanol. The wash liquid is united with the solution initially separated. The combined solid components of the discharge are dried at 160° C. at 0.1 mm until the weight is constant. The rhodium content in the liquid and solid portions of the discharge obtained in this way is determined quantitatively by atomic absorption and X-ray fluorescence analysis.

TABLE 1

In each of Examples 1 to 12, $p_{H_2}$ is 200 atmospheres gauge and the time t is one hour.

| Example | Carrier | °C | % Rh |
|---|---|---|---|
| 1 | 5 g animal charcoal powder, 1% Pd | 100 | 88.4 |
| 2 | 5 g animal charcoal powder, 1% Pd | 130 | 95.0 |
| 3 | 5 g animal charcoal powder, 1% Pd | 160 | 99.9 |
| 4 | 2.5 g animal charcoal powder, 1% Pd | 160 | 99.0 |
| 5 | 5 g activated carbon chips, 5% Pd | 100 | 96.1 |
| 6 | 5 g activated carbon chips, 5% Pd | 140 | 96.5 |
| 7 | 2 g activated carbon chips, 5% Pd | 160 | 95.5 |
| 8 | 2 g activated carbon chips, 5% Pd | 180 | 96.7 |
| 9 | 1.25 g activated carbon chips, 5% Pd | 180 | 96.1 |
| 10 | 5 g Al$_2$O$_3$ chips, 0.125% Pd | 180 | 93.2 |
| 11 | 3 g animal charcoal powder, 0.8% Pd | 180 | 97.5 |
| 12 | 2.5 g animal charcoal powder | 160 | 76 |

% Rh = % by weight of rhodium (based on rhodium used) which is deposited on the carrier Material

EXAMPLES 13 to 25

In the following examples rhodium fixed on a carrier material is dissolved with the formation of homogeneous solutions.

2 g of rhodium-containing carrier material prepared according to Example 4, which contains 10 mg of rhodium, together with 190 ml of solvent is exposed for a period of 3 hours at a temperature T to a carbon monoxide pressure $P_{CO}$ in a 0.8 liter high pressure vessel. The solvents used in these experiments are the pure organic compounds set out in the following Table 2 and also the mixtures and solutions. After the contents of the high pressure vessel have been cooled to room temperature and released to atmospheric pressure the whole discharge is separated by filtration and centrifuging into solid and liquid constituents. The solid residue is washed with methanol until the methanol can be suction filtered colorless from the solid residue. The methanol wash liquid is united with the liquid constituents of the reaction discharge. The content of homogeneously dissolved rhodium in this solution is determined quantitatively by atomic absorption. The solid constituent of the discharge which has been washed with methanol is dried to constant weight at room temperature in a high vacuum. The content of rhodium in this dried solid constituent is determined by X-ray fluorescence analysis.

The following Table 2 contains the results of a number of experiments.

The following abbreviations are used in Table 2:

Ex = Example No.
$P_{CO}$ = carbon monoxide pressure in atmospheres gauge
T = temperature of treatment in ° C.
Rhod = % by weight of dissolved rhodium based on the weight of rhodium fixed on the carrier used.

| Ex | Solvent/complex ligand | $P_{CO}$ | T | Rhod |
|----|------------------------|----------|-----|------|
| 13 | $C_6H_5NO_2$ | 700 | 160 | 53.8 |
| 14 | 85.6% $CH_3OH$, 14.4% $C_4$-cut | 700 | 140 | 50.1 |
| 15 | 82% $CH_3OH$, 18% styrene | 700 | 140 | 79.5 |
| 16 | 79.2% methanol, 16.6% styrene 4.16% iodine | 300 | 140 | 74.4 |
| 17 | 300 at.g. $C_2H_2$/CO 11:89, $CH_3OH$ | | 140 | 72.9 |
| 18 | 400 at.g. $C_2H_2$/CO 11:89, $CH_3OH$ | | 140 | 68.7 |
| 19 | 400 at.g. $C_2H_2$/CO 11:89, $CH_3OH$ | | 160 | 77.3 |
| 20 | 95% $CH_3OH$, 5% ammonia | 700 | 140 | 75.1 |
| 21 | 95% $CH_3OH$, 5% methylamine | 700 | 140 | 71.0 |
| 22 | 95% $CH_3OH$, 5% azobenzene | 700 | 120 | 58.7 |
| 23 | 44.6% $CH_3OH$, 55.4% pyridine | 700 | 140 | 84.4 |
| 24 | 83% $CH_3OH$, 17% methyl iodide | 700 | 140 | 84.0 |
| 25 | 96% $CH_3OH$, 4% $P(C_6H_5)_3$ | 700 | 140 | 36.8 |

We claim:

1. A process for separating rhodium from solutions containing rhodium carbonyl complexes and products obtained in the carbonylation of alkanols or of olefinically or acetylenically unsaturated compounds with carbon monoxide and water, and converting the rhodium separated into a soluble rhodium carbonyl complex which comprises:

contacting said solutions with hydrogen at a temperature of from 25° to 300° C. and at a pressure of from 1 to 700 atmospheres in the presence of a carrier such as is conventionally used for hydrogenation catalysts to precipitate the rhodium on the carrier; separating the solution devoid of rhodium; and contacting the rhodium precipitated onto the carrier with carbon monoxide in the presence of an aliphatic, cycloaliphatic or aromatic hydrocarbon, alkanol, ester, ether, ketone, amine or organic nitro compound as a solvent and in the presence of an olefinicably or acetylenically unsaturated hydrocarbon, organic compound of trivalent nitrogen, phosphorus or arsenic, ammonia, ammonium, phosphonium or arsonium salts or free halogen as a compound capable of replacing the carbon monoxide as a ligand at a temperature of from 20° to 300° C. and at a pressure of from 1 to 700 atmospheres whereby rhodium carbonyl complexes are reformed.

2. The process of claim 1 wherein the solution containing a rhodium carbonyl complex used as starting material is one obtained in the carbonylation of methanol, ethylene, acetylene or butadiene.

3. The process of claim 1 wherein the carrier used is activated carbon, silica gel, aluminum oxide, infusorial earth or magnesium oxide.

4. The process of claim 1 wherein the carrier has a content of 0.01 to 10% by weight of palladium, platinum, rhodium, iridium, ruthenium or osmium.

5. The process of claim 1 wherein contacting with hydrogen is carried out at a temperature of 100° to 200° C. and at a pressure of 100 to 200 atmospheres.

6. The process of claim 1 wherein the rhodium precipitated onto the carrier is contacted at a temperature of from 100° to 200° C. and a pressure of from 100 to 700 atmospheres with carbon monoxide.

7. The process of claim 1 wherein pyridine, methyl iodide, styrene, acetylene, ammonia, azobenzene or an alkylamine is used as the compound capable of replacing carbon monoxide as a ligand.

* * * * *